United States Patent [19]
Evans et al.

[11] Patent Number: 5,765,504
[45] Date of Patent: *Jun. 16, 1998

[54] COLLAPSIBLE ANIMAL BOX

[75] Inventors: Riley Evans, Bremerton; Kelly Rotroff, Enumclaw, both of Wash.

[73] Assignee: Topcat International Inc., Bellevue, Wash.

[*] Notice: The term of this patent shall not extend beyond the expiration date of Pat. No. 5,572,951.

[21] Appl. No.: 745,214

[22] Filed: Nov. 8, 1996

Related U.S. Application Data

[63] Continuation of Ser. No. 397,661, Feb. 28, 1995, Pat. No. 5,572,951.

[51] Int. Cl.⁶ ........................... A01K 29/00
[52] U.S. Cl. ........................... 119/168
[58] Field of Search ............... 119/168, 166, 119/165, 416, 431, 461, 474, 491, 513

[56] References Cited

U.S. PATENT DOCUMENTS

| | | | |
|---|---|---|---|
| 3,886,901 | 6/1975 | Zeitter | 119/1 |
| 4,792,082 | 12/1988 | Williamson | 229/103 |
| 4,800,842 | 1/1989 | Jones, Jr. | 119/168 |
| 4,940,016 | 7/1990 | Heath . | |
| 4,986,217 | 1/1991 | Robinson et al. . | |
| 5,014,649 | 5/1991 | Taft | 119/168 |
| 5,035,205 | 7/1991 | Schiller et al. . | |
| 5,058,528 | 10/1991 | Counseller et al. . | |
| 5,117,781 | 6/1992 | Roach | 119/168 |
| 5,167,205 | 12/1992 | Bell et al. . | |
| 5,178,100 | 1/1993 | Monk . | |
| 5,203,282 | 4/1993 | Hasiuk | 119/168 |
| 5,337,700 | 8/1994 | Toft . | |

*Primary Examiner*—Thomas Price
*Attorney, Agent, or Firm*—Klarquist Sparkman Campbell Leigh & Whinston, LLP

[57] ABSTRACT

A collapsible animal box which can be conveniently shipped, marketed and discarded in collapsed form is disclosed. The box may contain animal litter and an animal litter container. Preferably, the animal box is constructed from a single cut and scored blank of foldable material. The assembled, fully extended animal box encloses a space sufficiently large to accommodate an animal litter container and at least one animal, and includes a door positioned to permit entry and egress by the animal.

16 Claims, 7 Drawing Sheets

COLLAPSIBLE ANIMAL BOX

This is a continuation of application Ser. No. 08/397,661, filed Feb. 28, 1995, now U.S. Pat. No. 5,572,951.

TECHNICAL FIELD

This invention relates to a collapsible animal box, and more particularly to a disposable, collapsible cat box which can be conveniently shipped, marketed and discarded in collapsed form, preferably with cat litter and a cat litter container enclosed.

BACKGROUND OF THE INVENTION

Cats instinctively seek to bury their feces in loose, particulate material. To accommodate this natural behavior, various types of particulate materials, commonly called "litter," have long been commercially available to cat owners who place the litter in some form of receptacle for use by their pet inside the home. Commercially available litter material generally consists of calcined granular, absorbent clay, and often contains an odor-depressant chemical to reduce dispersion of waste odors. Cat litter is most commonly sold in waterproof paper sacks with tear strips for opening, although litter is also sold in boxes and plastic jugs.

There are a variety of receptacles for cat litter, the most common being a four-sided, open-topped tray, designed to hold a layer of litter up to several inches deep. The walls of the conventional litter tray are designed to extend vertically up to several inches above the top surface of the litter to reduce the spilling of litter over the sides of the tray as the cat digs and scratches to bury its waste.

One disadvantage of the conventional litter tray is that litter is frequently spilled onto the floor around the tray as the cat owner pours litter from the litter package into the tray. A second disadvantage of the litter tray is that, despite the somewhat elevated side walls, cats frequently kick litter over the sides of the tray in the process of burying their feces. This litter material is often clumped with urine or contaminated with fecal matter, creating an unsanitary and unpleasant cleanup task for the cat owner.

A third disadvantage of the conventional litter tray is that urine seeps down to the bottom layers of litter causing the litter material in contact with the floor and lower wall portions of the tray to form moistened, urine-saturated clumps which must be vigorously scraped and scrubbed in order to be removed. A fourth disadvantage is that because the conventional litter tray is generally made out of plastic or some other unfoldable, synthetic material, it is not readily disposable. Consequently, the tray must be cleaned each time a new batch of litter becomes too saturated or malodorous for continued use.

A fifth disadvantage of the conventional litter tray is that waste odors disperse freely into the air surrounding the litter tray, creating a zone of offensive odor in the vicinity of the tray. In summary, while cat owners find the conventional cat litter tray superior to providing no indoor receptacle for holding cat litter and receiving cat waste, the litter tray often becomes a source of foul odors and unsightly, unsanitary floor debris.

U.S. Pat. No. 3,886,901 ("the '901 patent") discloses an example of a disposable, folded cat box with filler material package. There, a folded cat box encloses a bag of cat litter which substantially fills the box. The box is opened by means of a tear strip extending across the top panel of the box and a short distance down the front and rear panels. To use the cat box of the '901 patent, the cat owner removes the tear strip and folds the top panels outwardly apart to form the walls of a four-sided litter tray. The filler material in the enclosed litter package is then poured from the package into the tray.

The '901 patent advanced the art by disclosing a disposable version of the conventional litter tray. However, problems associated with the conventional litter tray, such as spilling of litter as it is poured from the package into the tray, odor dispersion from the open tray top and the expelling of contaminated litter over the sides of the tray, remain.

Therefore, a primary object of this invention is to provide a cat litter box that will inhibit dispersion of waste odors, provide substantially improved containment of contaminated litter material and provide a more convenient and sanitary means for disposing of used cat litter.

Another object of the invention is to provide a cat box which eliminates the need to pour litter into the cat box, thereby reducing the incidence of litter spills.

Yet another object is to provide an improved means for shipping, handling and storing cat litter with reduced incidence of tearing and litter spillage.

Other objects will be apparent from the drawings and following detailed description of an illustrated embodiment.

SUMMARY OF THE INVENTION

The present invention is directed to a collapsible animal box which can be conveniently transported, marketed and discarded in collapsed form with animal litter and an animal litter container enclosed. Preferably, the animal box of the invention is a cat box constructed from a single blank of cut and scored foldable material, such as corrugated cardboard. The assembled cat box preferably comprises six hingedly connected walls, including a foldable front panel, two foldable side panels, a foldable rear panel, a roof and a floor. However, in alternative embodiments, the cat box may consist of more or less than six walls. The box encloses an internal space sufficiently large to accommodate a cat litter container and at least one full-grown adult cat.

The front panel includes a door positioned to allow a full grown adult cat to enter and exit the cat box. Preferably, the door comprises at least one pivotable door flap, wherein a first portion of the flap is detached from a first adjoining front panel portion and a second portion of the flap is hingedly connected to a second adjoining front panel portion. More preferably, the door further includes a lock for securing the door flap or flaps in an open position.

The cat box of the present invention may also include gripping locations to facilitate unfolding, grasping and carrying of the cat box. Preferably, the gripping locations comprise two opposed openings, one positioned on each of the side panels, wherein each opening is sufficiently large to permit the insertion of four fingers by the cat owner.

The cat box may further include a scooping port to facilitate the removal of cat waste from the enclosed cat litter container, prolonging the life of the disposable container. Preferably, the scooping port comprises a hingedly movable scooping port flap that can be moved to create an opening sufficiently large to permit the insertion of a scoop for removal of the cat waste.

The cat box preferably is packaged, shipped and used with a litter container filled with cat litter, which rests on the bottom panel of the cat box and substantially fills the bottom surface area of the cat box. Alternatively, the cat box may be sold with an empty tray to permit the cat owners to use their own preferred brand of cat litter or with no tray at all.

Preferably, the collapsing of the cat box occurs by folding of the side, front and rear panels at fold lines positioned on the panels. The collapsing occurs by the inward folding of side, front and rear panels along fold lines.

DETAILED DESCRIPTION OF AN ILLUSTRATED EMBODIMENT

An illustrated embodiment of a collapsible cat box 10, enclosing a cat litter container 34, and manufactured in accordance with the present invention is depicted in FIGS. 1–10. This invention relates to a disposable, collapsible cat box which can be conveniently shipped, marketed and discarded in collapsed form, preferably with cat litter and a cat litter container enclosed. When unfolded, the fully-extended cat box defines an enclosure sufficiently large to hold a cat litter container and at least one full-grown adult cat, leaving adequate room for the cat to move about in order to excrete and bury its waste. Preferably, the cat box has a single door positioned to permit easy entrance and egress by the cat.

Figure 1:
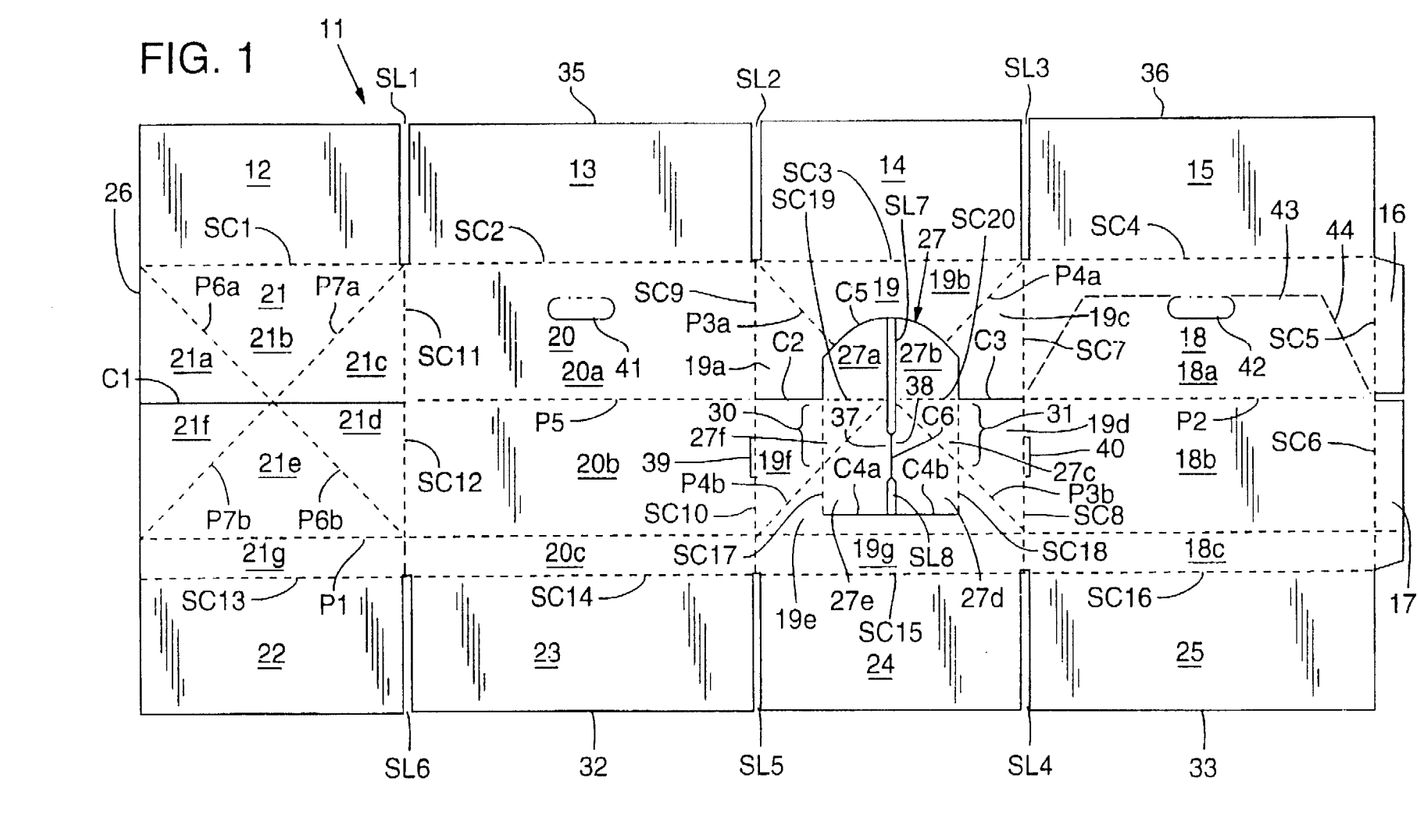
FIG. 1 is a plan view of the blank used to construct a collapsible cat box in accordance with one embodiment of the present invention.
Figure 7:
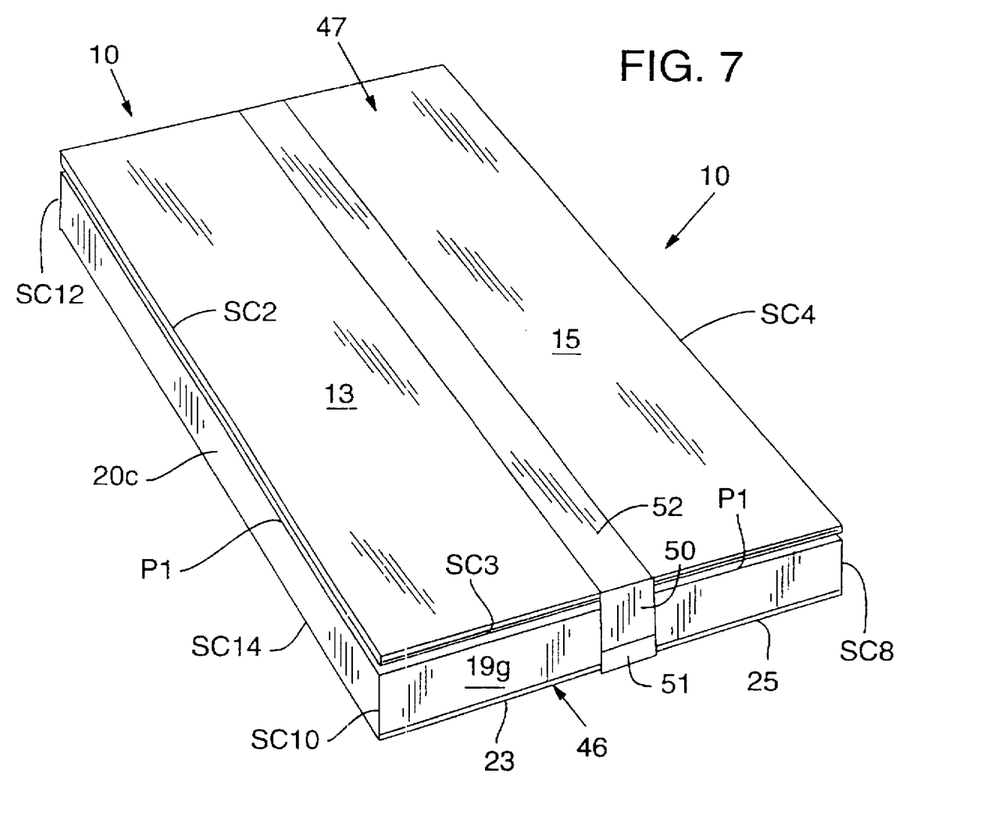
FIG. 7 is a perspective view of the cat box in a fully collapsed condition.

Preferably, the cat box of the present invention comprises six walls, including: a pair of opposed side panels 18, 20, a front panel 19, a rear panel 21, a roof 47 and a floor 46. Preferably, the box 10 is made from a single cut and scored blank 11, as shown in FIG. 1. The blank 11 is assembled into the cat box shown in FIGS. 2, 3, and can be collapsed for shipping, marketing and disposal, as shown in FIG. 7.

As stated, the cat box 10 is preferably constructed from a single blank 11 of foldable, disposable material. The blank 11 is preferably divided into panels, subpanels, flaps, a door, apertures, gripping locations and a scooping port by score lines, perforated score line segments, slots and cut lines. Score lines ("SC") are continuous lines which crease the box without penetrating its surface to facilitate folding along the path of the scoring. Cut lines ("C") are thin, continuous line segments formed by slicing completely through the box material such that opposing edges along the cut line generally abut one another when the box is in fully unfolded condition. Perforated score lines ("P") comprise short, alternating segments of score lines and cut lines of about equal length. Slots ("SL") are elongated openings defined by opposing flap edges separated by a relatively small, uniform distance along their lengths.

Turning to FIG. 1, the blank 11 is made of a pliant, foldable material such as corrugated cardboard, folding carton stock, paperboard, solid fiberboard, foldable plastics, vinyls and acetates, and other similar foldable materials. The blank 11 is sufficiently large so that when folded into a box shape it defines an enclosure of a size sufficient to accommodate the litter container 34 and a full grown adult cat, permitting some room for movement by the cat. The substantially rectangular blank 11 is divided by score lines SC1–SC20 and slots SL1–SL8 into hingedly connected panels, subpanels and flaps, a partial listing of which includes front panel 19, rear panel 21, side panels 18, 20, roof subpanels 13, 15, top flaps 12, 14, floor subpanels 23, 25, bottom flaps 22, 24 and attachment flaps 16, 17. The opposing flap edges that define slots SL1–SL8 are spaced sufficiently far apart so as not to impede the collapsibility of the cat box. As will be described in greater detail below, the collapsing of the cat box 10, assembled from the above-described blank 11, occurs primarily by folding at perforated score lines P1, P2, P3a and b, P4a and b, P5, P6a and b, P7a and b. The collapsing is facilitated by horizontal cut lines C1–C3 and score lines SC19, SC20. Accordingly, the aforementioned perforated score lines, score lines and cut lines may be generally referred to as fold lines.

Figure 5:
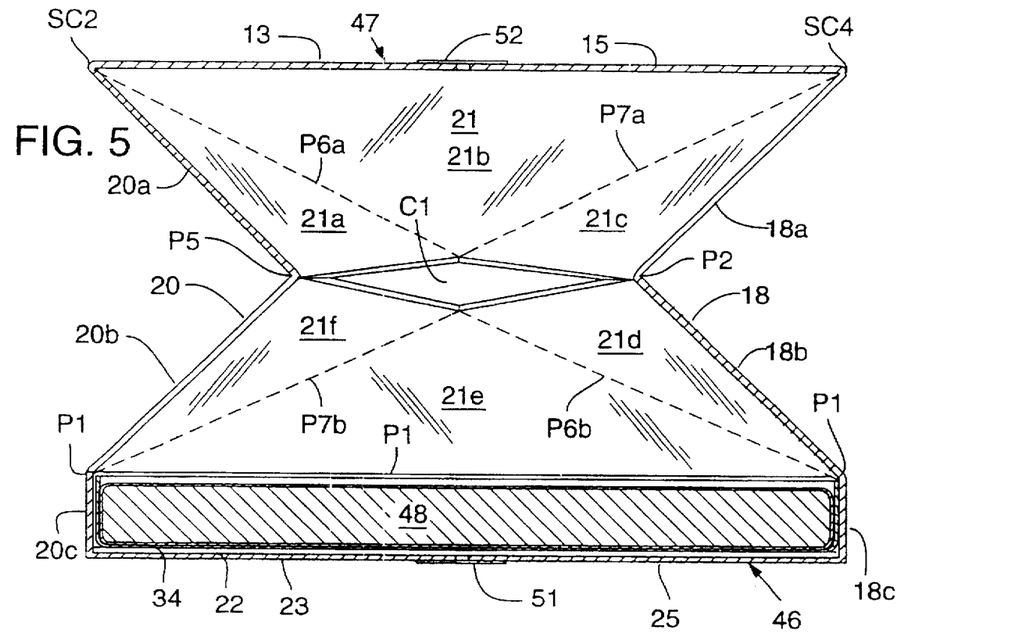
FIG. 5 is a rear perspective view of the cat box in a partially collapsed condition.
Figure 6:
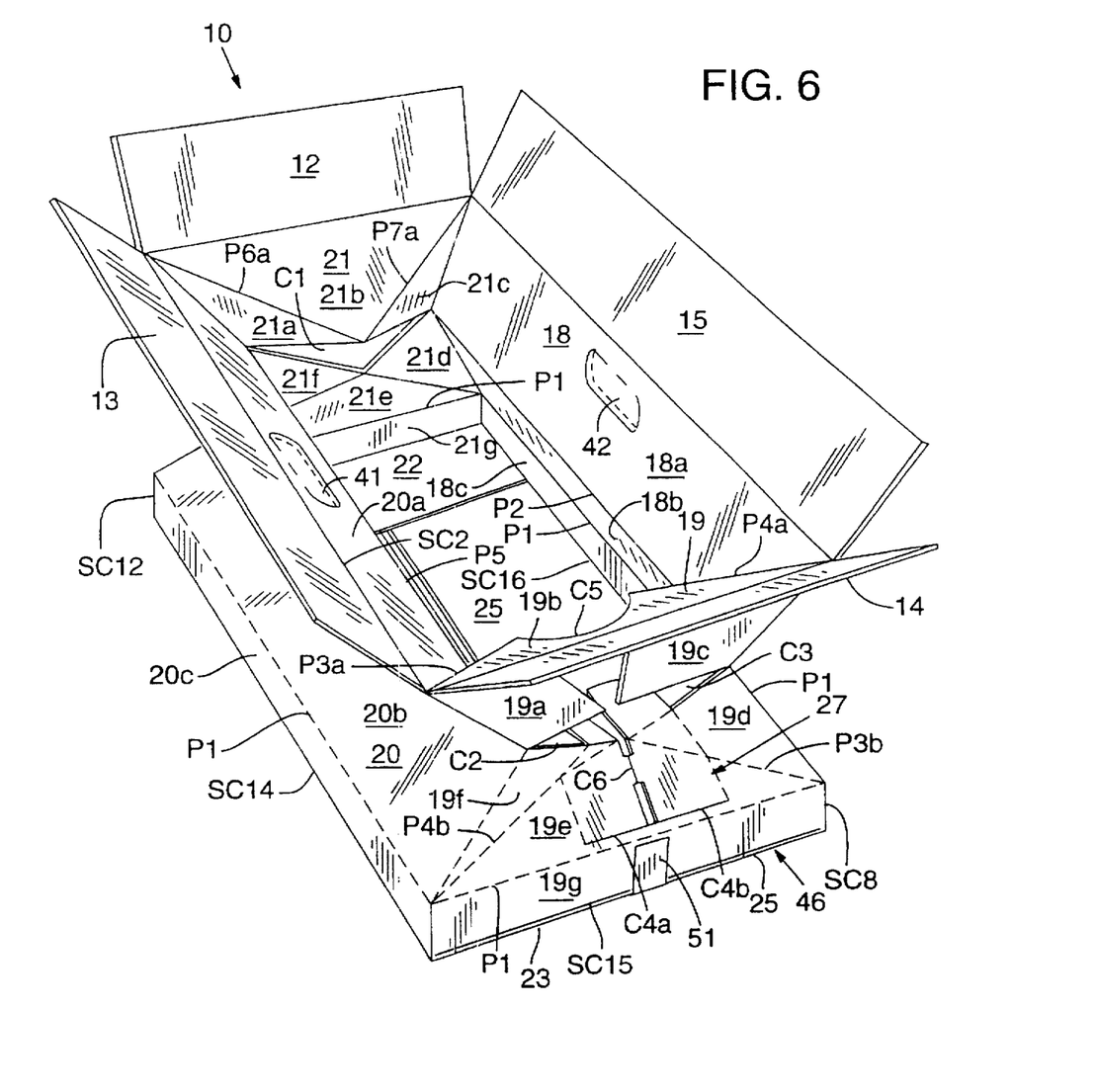
FIG. 6 is an overhead perspective view of the cat box in a partially collapsed condition, with roof panels thereof open to show the interior of the cat box.

Referring again to FIG. 1, rear panel 21 is divided by perforated score lines P1, P6a and P6b, P7a and P7b, and cut line C1 into subpanels 21a, 21b, 21c, 21d, 21e, 21f, each forming an isosceles right triangle, and rectangular subpanel 21g. In a preferred embodiment, subpanels 21a, 21c, 21d and 21f have substantially identical dimensions. Likewise, subpanels 21b and 21e are substantially identical mirror images of one another, but materially different in dimension from subpanels 21a, 21c, 21d and 21f. In a preferred embodiment, the relative areas of triangular subpanels 21a–f may be expressed substantially as follows: 21b=21e>21a= 21c=21d=21f. Perforated score lines P6a and b form a continuous diagonal line segment, interrupted at its midpoint by cut line C1, extending from the top left-hand corner of rear panel 10 to the vertex created by the intersection of perforated score line P1 and score line SC12. Similarly, perforated score lines P7a and b form a continuous diagonal line segment, interrupted at its midpoint by cut line C1, extending from the top right hand corner of rear panel 21 to the vertex produced by the intersection of perforated score line P1 and edge 26. In the blank 11 (or the fully unfolded cat box), perforated score lines P6a,b and P7a,b intersect to form an "X" shape, as shown in FIG. 1. Cut line C1 extends continuously in a horizontal straight line from perforated score line P5 on side panel 20 across rear panel 21 in parallel with perforated score line P1 and perpendicular to edge 26. Subpanels 21a, b and c lie above cut line C1 and together form a rectangular area having a width equal to the width of adjacent subpanel 20a. Likewise, subpanels 21d, e and f lie below cut line C1 and together form a rectangular area having a width equal to the width of adjacent subpanel 20b. Rectangular subpanel 21g has length equal to the length of rear panel 21 and width equal to the width of adjacent subpanel 20c. The above-described cut lines and perforated score lines together produce a rear panel which collapses in bellows-type fashion along the horizontal plane defined by the vent produced by cut line C1, as shown in FIGS. 5–6.

Figure 2:
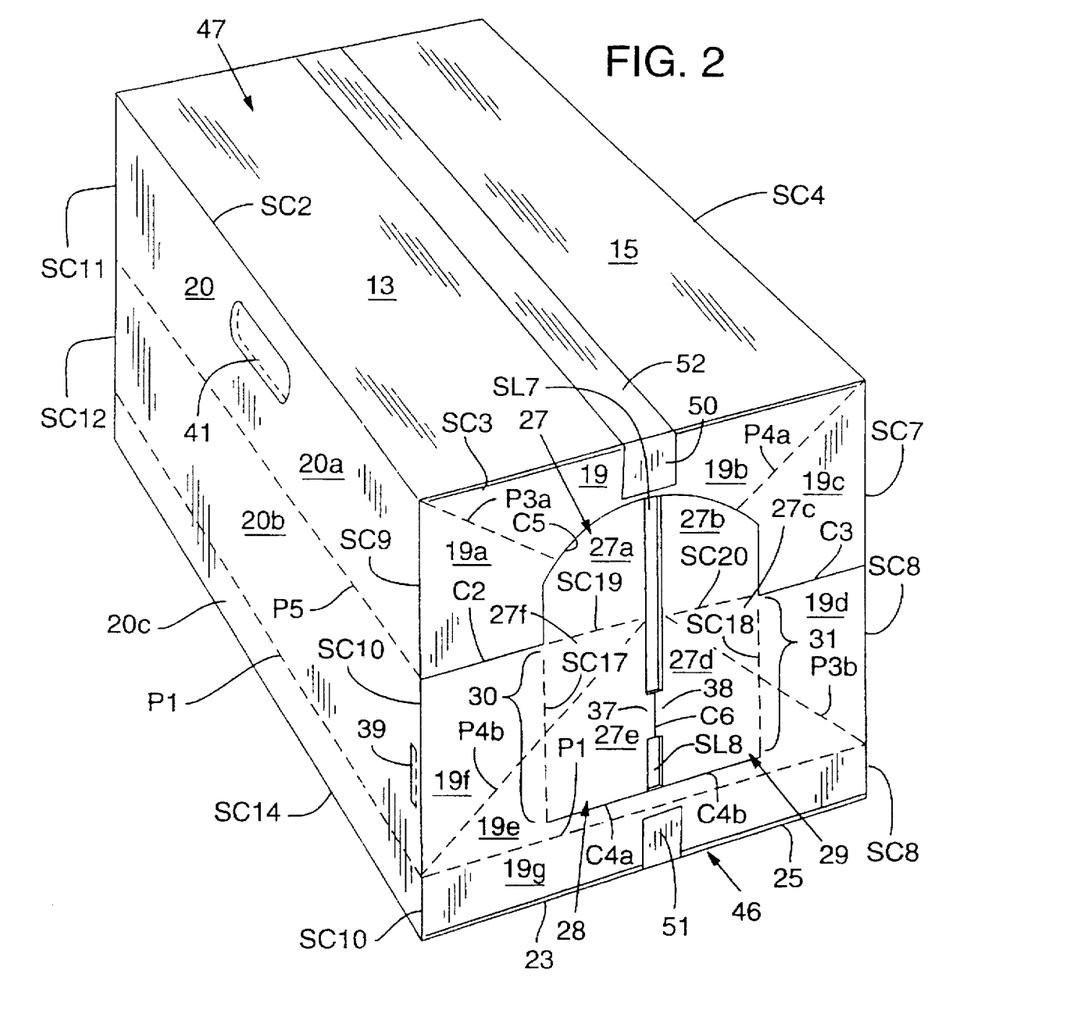
FIG. 2 is a perspective view of the cat box in a fully extended condition, with a front door thereof in a closed position.

Referring now to FIG. 2, the front panel 19 is subdivided into a door 27 and surrounding front subpanels 19a–g. Door 27 is further subdivided into door subpanels 27a–f. Door 27 is approximately centrally disposed in front panel 19, as shown in FIGS. 1, 2. The outer dimensions of door 27 are defined by cut lines C4a, C4b and C5, and by score lines SC17 and SC18. Door 27 is divided into a left door flap 28 and a right door flap 29, which are preferably mirror images of one another. The left and right door flaps 28, 29 are produced by a vertical line bisecting door 27, consisting of upper slot SL7, intermediate cut line C6 and lower slot SL8. Left door flap 28 is hingedly connected to adjoining portions of front subpanels 19e, 19f by left hinge 30, defined by vertical score line SC17. Likewise, right door flap 29 is hingedly connected to adjoining portions of front subpanels 19d, e by right hinge 31, defined by vertical score line SC18. The upper ends of hinges 30, 31 terminate at cut lines C2 and C3, respectively, at the point where those cut lines meet partially arcuate cut line C5. The lower ends of hinges 30, 31 terminate at a point somewhat above perforated score line P1. Inward and outward movement of door flaps 28, 29 is facilitated by horizontal cut lines C4a and C4b which define the lower edge of door 27, and which extend between and perpendicular to the lower ends of hinges 30, 31. Movement of door flaps 28, 29 is also facilitated by cut line C5 which defines an archway extending above and between the top ends of left and right hinges 30, 31.

Diagonal, perforated score lines P3a, b and P4a, b of front panel 19 resemble diagonal, perforated score lines P6a, b and P7a, b of rear panel 21, except that, unlike perforated score lines P6a and P7a, perforated score lines P3a and P4a do not extend to meet the diagonal perforated score lines rising from the lower half of the panel to complete the "X" shape. Instead, due to functional aspects of door flaps 28, 29 described below, perforated score lines P3a and P4a terminate at partially arcuate cut line C5, above left and right door flaps 28, 29, respectively. Consequently, in the blank 11 (or fully unfolded box), perforated score lines C3a–b and C4a–b together resemble an "X" with a segment missing from the medial portion of each upper arm. The collapsing of front panel 19 results from folding at perforated score lines P1, P3a; b and P4a, b, and is facilitated by cut lines C2, C3, C5 and score lines SC19, SC20.

Referring to FIGS. 1, 2, side panel 20 is divided by perforated score lines P1 and P5 into three subpanels 20a, 20b and 20c, each having length coextensive with the length of side panel 20. The relative widths of subpanels 20a, 20b and 20c may be expressed substantially as follows: 20a=20b>20c. Similarly, perforated score lines P1 and P2 divide side panel 18 into subpanels 18a, 18b and 18c, each having length coextensive with the length of side panel 18. The relative widths of subpanels 18a, 18b and 18c may be expressed substantially as follows: 18a=18b>18c. Moreover, in a preferred embodiment, the relative widths of subpanels 18a–c and 20a–c are substantially as follows: 18a=18b=20a=20b>18c=20c.

Figure 3:
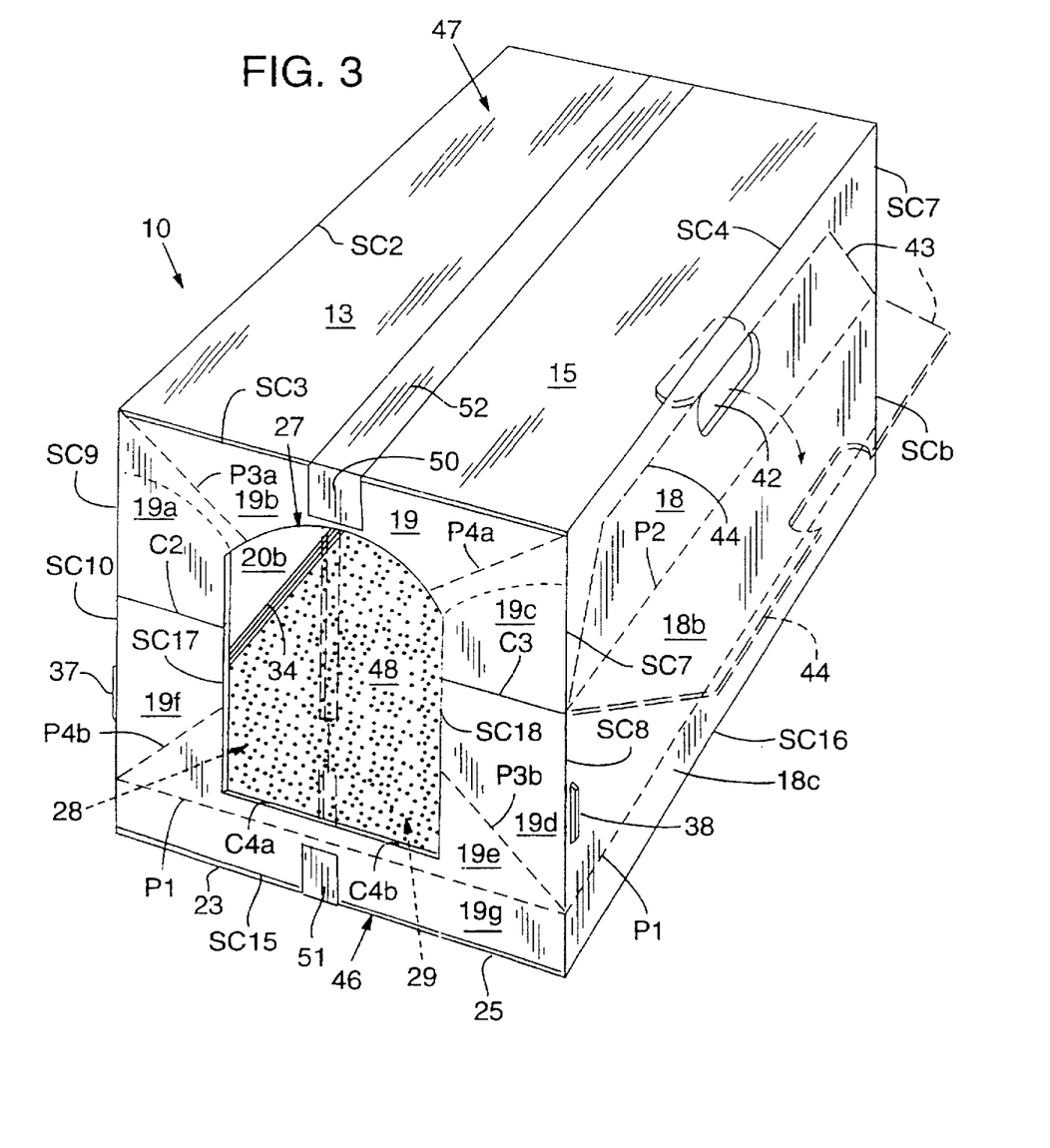
FIG. 3 is a perspective view of the cat box with the front door in an open position, and showing a cat litter container filled with cat litter enclosed therein.

Referring to FIGS. 1–3, the roof 47 comprises roof subpanels 13, 15, folded along score lines SC2, SC4, and top flaps 12, 14, folded along score lines SC1, SC3. Once the box is assembled, roof subpanels 13, 15 are preferably secured in a closed position by applying a strip of tape 52 along opposing edges 35, 36 of folded roof subpanels 13, 15. Other securing means, such as non-tape adhesives or staples may be used to secure the roof subpanels in a closed position.

Similarly, the floor 46 comprises floor subpanels 23, 25, folded along score lines SC14, 16, and bottom flaps 22, 24, folded along score lines SC13, 15. Once the box is assembled, the floor subpanels 23, 25 are preferably secured in a closed position by applying a strip of tape 51 along opposing edges 32, 33 of folded floor subpanels 23, 25. Other securing means, such as non-tape adhesives or staples may be used to secure the floor subpanels in a closed position.

Assembling the Illustrated Cat Box

The blank 11 is divided and subdivided by slots, cut lines, score lines and perforated score lines, as described above, so that the assembled box comprises: a foldable front panel having a door sized and positioned to permit a cat to enter and exit the box; a foldable rear panel opposing the front panel; a pair of opposing foldable side panels hingedly connected to the front and rear panels; a roof hingedly connected to the front, rear and side panels; and a floor hingedly connected to the front, rear and side panels. The front, rear and side panels each have at least one fold line to permit the roof and floor to be collapsed toward one another; wherein the cat box, when extended, creates an enclosed space of sufficient size to accommodate at least one full-grown adult cat and, when collapsed, creates a compact box for storage, shipment and disposal.

The blank 11 may be assembled into the cat box 10 according to the following steps:

The blank 11 is folded at the vertical line defined by slot SL3, score lines SC7 and 8, and slot SL4 so that attachment flaps 16, 17 move rearwardly with respect to front panel 19 until side panel 18 is perpendicular to front panel 19. Similarly, the blank 11 is folded at the line defined by slot SL2, score lines SC9 and SC10, and slot SL5 so that edge 26 moves rearwardly with respect to front panel 19 until side panel 20 is perpendicular to front panel 19. The box is also folded at the line defined by slot SL1, score lines SC11, SC12 and slot SL6 so that edge 26 moves angularly with respect to side panel 20 until rear panel 21 is perpendicular with respect to side panels 18, 20.

Attachment flaps 16, 17 are folded inwardly with respect to side panel 18 until they are perpendicular to side panel 18. Glue or adhesive is then applied to the rearward side of attachment flaps 16, 17 and the attachment flaps are pressed against the inside vertical margin of rear panel 21 such that the partially assembled box forms a four-sided enclosure open at the top and bottom. Alternatively, glue or adhesive may be applied to the inside, vertical right-hand margin of rear panel 21, which is then pressed against the rearward side of attachment flaps 16, 17 to form the partially enclosed space. Other securing means besides glue or adhesive also may be used.

The bottom flaps 22, 24 are folded inwardly along score lines SC13, SC15 until they lie in a common horizontal plane perpendicular to the vertical planes defined by the front and rear panels 19, 21. The floor subpanels 23, 25 are next folded inwardly along score lines SC14, SC16 until they lie in a common horizontal plane just below flaps 22, 24 and likewise perpendicular to side panels 18, 20. Tape strip 51 or other adhesive material is applied along the line defined by opposing edges 32, 33 of floor subpanels 23, 25 to secure the floor subpanels and bottom flaps in closed position, thereby forming the floor 46. Alternatively, staples or other attachment means may be used to secure the floor subpanels and bottom flaps in a closed position.

Preferably, before folding the top flaps and roof subpanels, a cat litter container 34 is lowered through the open top of the five-sided enclosure and positioned so that it lies flat against the cat box floor. The container is sized to substantially fill the parallelepiped-shaped space in the bottom of the enclosure, which space is defined by the floor 46, side panels 18, 20 and front and rear panels 19, 21. The bottom of the container may be adhered or otherwise secured to the bottom of the enclosure. Top flaps 12, 14 are folded inwardly along score lines SC1, SC3 until they lie in a common horizontal plane perpendicular to the vertical planes defined by rear panels 19, 21. Roof subpanels 13, 15 are folded inwardly along score lines SC2, SC4 until they lie in a common horizontal plane just overlying flaps 12, 14 and likewise perpendicular to side panels 18 and 20. Tape strip 52 or other adhesive material is applied along the line defined by opposing edges 35, 36 of roof subpanels 13, 15 to secure the roof subpanels and top flaps in a closed position, thereby forming roof 47, as shown in FIGS. 2, 3. Alternatively, staples or other attachment means may be used to secure the roof subpanels and top flaps in a closed position.

It will be appreciated that the sequence of the above noted steps is not critical, and that the blank can be constructed or assembled in alternative ways to achieve a sturdy cat box having a pair of side walls, a front wall having a door, a rear wall, a roof and a floor.

Collapsing the Illustrated Cat Box

The cat box 10 is designed so that it can be conveniently shipped, marketed and discarded in collapsed form, as shown in FIG. 7. The cat box is collapsed by first pressing slightly inward at about the centers of front and rear panels 19, 21 so that front and rear subpanels are disposed to fold inwardly as downward pressure is applied from the roof of the box. The cat box can then be collapsed by applying gentle downward pressure on the roof 47. The accordion-type collapsing occurs by inward folding at perforated score lines P1, P2, P3a–b, P4a–b, P5, P6a–b and P7a–b. This folding action is facilitated by cut lines C1–C3 and door flap score lines SC19, SC20.

In collapsed form, the following pairs of subpanels come in face-to-face contact with each other: side subpanels 20a and 20b and side subpanels 18a and 18b; rear subpanels 21d and 21e, rear subpanels 21e and 21f, rear subpanels 21a and 21b, and rear subpanels 21b and 21c; front subpanels 19a and 19b, front subpanels 19b and 19c; combined front subpanel 19f/door subpanel 27f and combined front subpanel 19e/door subpanel 27e; and combined front subpanel 19d/door subpanel 27c and combined front subpanel 19e/door subpanel 27d. Door subpanels 27a, 27b fold inwardly at score lines SC19, SC20 and preferably come into face-to-face contact with internal portions of side subpanels 20b, 18b, respectively, by tucking under fold lines P2 and P5.

When the cat box is fully collapsed, roof 47 is approximately co-planar with the horizontal plane containing perforated score line P1, and the distance between the floor 46 and roof 47 is substantially equal to or slightly greater than the height of the flat-lying, enclosed cat litter container. The cat box is preferably secured in collapsed form by applying top tape 52 across a portion of the exposed shortened front panel, leaving pull tab 50 unattached to the front panel portion. Alternatively, the box may be secured in collapsed condition by surrounding the collapsed box in shrink-wrapped plastic, by a variety of clamp-like devices, or by non-tape adhesive material.

Using the Illustrated Cat Box

To use the collapsible cat box (see FIG. 7), the cat owner grasps pull tab 50 and pulls upwardly to lift top tape 52 off of the exposed portions of shortened front panel 19. Alternatively, the shrink wrap or other adhesive material securing the box in collapsed position is loosened or removed. After loosening top tape 52, folded end and side walls of the compressed cat box have a memory which causes the roof 47 to automatically spring a distance away from floor 46, thereby exposing gripping flaps 41, 42 in side panels 18, 20.

Referring to FIGS. 3, 6, gripping flaps 41, 42 provide openings into which the fingers of the cat owner's hands may be inserted in order to pull roof 47 away from floor 46 until the box is in fully extended position. Preferably, flaps 41, 42 are defined by a substantially oval-shaped line positioned in upper subpanels 18a, 20a, respectively. Preferably, the upper horizontal edge of the oval is a score line to provide a flap hinge, while the side and bottom edges of the oval are cut lines. To use flaps 41, 42 as hand holds, said flaps are pressed inwardly, creating a cut-out like opening sufficiently large to permit comfortable insertion of the cat owner's fingers on opposite sides of the roof. Preferably, flaps 41, 42 are positioned approximately midway along the length of side panels 18, 20 so the box is evenly balanced on either side of the grip position. It is also preferred that flaps 41, 42 are positioned close enough to the roof so that the thumbs of the cat owner's hand can be pressed flat against roof subpanels 13, 15 while four fingers are comfortably inserted into the opening created by pressing the flaps inwardly, giving the grasper a secure hold on the cat box. In addition to their unfolding function, flaps 41, 42, shown in FIGS. 1–3 and 6, also serve as gripping locations for picking up and moving the unfolded cat box 10.

Alternatively, flaps 41, 42 may have non-oval shapes, provided they define an opening large enough to permit insertion of the fingers for carrying purposes.

Referring to FIG. 3, once the cat box walls are fully extended, door flaps 28, 29 are preferably secured in an open position by pivoting them 180 degrees inwardly about their respective hinges 30, 31 (FIG. 2) until the inner surface of each of the door flaps lies substantially flat against the adjoining inner surface portion of front panel 19. Door flaps 28, 29 are locked into the open position when, during pivoting, door flap projections 37 and 38 insert into mating apertures 39 and 40, respectively.

Aperture 39 is a vertically oblong, slot-like opening in subpanel 20b bounded at its frontmost vertical edge by a segment of score line SC10 that lies directly across from cut line C6. Likewise, aperture 40 is positioned on subpanel 18b and is bounded at its frontmost vertical edge by a segment of score line SC8 that lies directly across from cut line C6. Apertures 39, 40 are sized to be just slightly longer than the vertical edges of door flap projections 37, 38 so that the projections can be securely positioned in the apertures to hold the door flaps open. When locked into the open position, door flaps 28, 29 provide substantial structural stability to the fully extended cat box. More specifically, the door flaps provides a semi-rigid interior backing for front subpanels 19a, 19c, 19d, 19e, 19f, inhibiting such subpanels from collapsing inwardly.

The cat box preferably has a single large flap 43 (FIG. 3) that can be opened to create a scooping port. The scooping port opening must be large enough to allow the cat owner to reach through the opening with a scoop to remove cat waste from the cat litter container. The scooping port flap 43 may be positioned in the upper subpanel portion of either of the two side panels 18a, 20a. As shown in FIG. 3, for example, a scooping port flap 43 is hingedly connected to subpanel 18b at perforated score line P2. The remaining flap edges are defined by super-perforated score line 44 which, together with perforated score line P2, defines a large flap 43 having a substantially trapezoidal shape. The cut line segments of super-perforated score line 44 are substantially longer than the alternating score line segments so that the cat owner can easily detach said scooping port flap 43 from surrounding side panel portions along super-perforated score line 44 to create the scooping port opening. When the scooping port is in use, scooping port flap 43 is pulled outwardly as shown in FIG. 3, creating a large opening. When not in use, scooping port flap 43 can be closed by pushing it back into alignment with surrounding portions of subpanel 18a.

Alternatively, the scooping port flap can have a non-trapezoidal shape.

It should be appreciated that the openings which can be produced by hingedly moving gripping location flaps 41, 42 and scooping port flap 43 may also provide ventilation for the interior of the cat box in warm weather. Additional openings for ventilation may be added consistent with the objectives of the present invention.

When the cat owner is ready to dispose of the cat box 10 with the enclosed cat litter container 34, projections 37, 38 are removed from door flap apertures 39, 40 and door flaps 28, 29 are returned to the closed position. The cat box is then collapsed and secured as described above. The collapsed box with enclosed used cat litter and litter container may then be disposed of in an appropriate waste receptacle.

As can be seen, the cat box of the present invention solves many of the problems associated with conventional litter trays. First, the cat box provides an enclosure which substantially reduces or eliminates the spillage of contaminated litter onto the floor surrounding the cat box. The side panels and rear panel provide virtually complete barriers to litter spillage. The front panel, which contains the door opening, presents a substantial barrier to litter spillage due to the elevated positioning of the door above score line P1 and the upper surface level of the cat litter. Moreover, the enclosed structure of the assembled cat box inhibits the dispersion of waste odors into the air space surrounding the box. Also, the cat box can be conveniently shipped, marketed and discarded in collapsed condition with cat litter and a cat litter container enclosed, thus reducing the incidence of litter spillage at all stages from manufacture through disposal.

The Cat Litter Container of the Illustrated Embodiment

Figure 4:
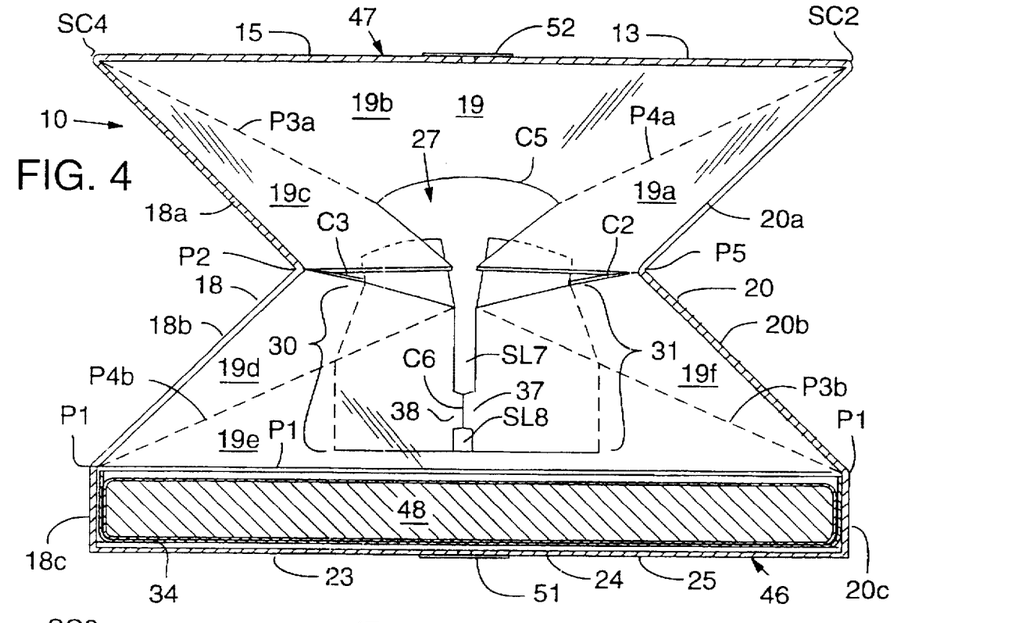
FIG. 4 is a front perspective view of the cat box in a partially collapsed condition.

Referring to FIGS. 3–5, the cat box encloses a cat litter container consisting of a four-sided tray 34 sized to substantially fill the space at the bottom of the cat box enclosure. Preferably, the tray is made of plastic or some other lightweight, disposable material. The litter tray preferably is shipped and sold with an effective amount of cat litter 48 enclosed. An effective amount of cat litter is an amount sufficient to enable a cat to fully bury its feces in the litter. The cat litter tray 34 with enclosed cat litter 48 may be covered with a shrink-wrapped plastic top or other removable cover to prevent litter spillage during transport. For example, the upper surface of the tray cover may be provided with a tear tab along its perimeter to enable the cat owner to easily remove the cover to expose the cat litter. Alternatively, the cat litter can be enclosed within the cat box in an open cat litter container/tray or within a tray, since the cat box, when collapsed for transportation, will still completely enclose the cat litter. A tray of plastic or the like is preferred to provide a moisture proof liner at the bottom of the cat box. The tray may also be adhered or otherwise secured at its bottom to the inside bottom surface of cat box 10.

It will be appreciated that the present invention offers numerous advantages even without the litter container and cat litter. For example, cat owners prefer to use their own preferred brand of cat litter.

Alternative Embodiments

Figure 8:
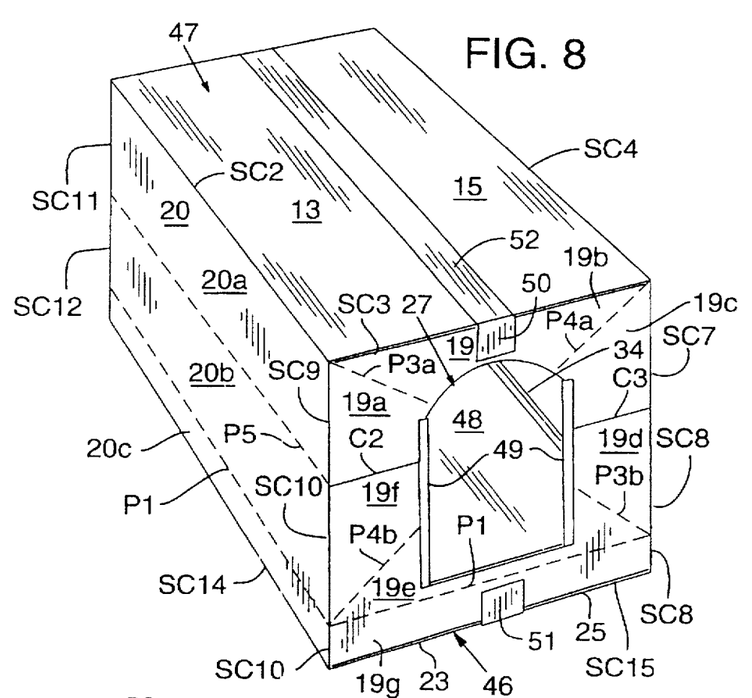
FIG. 8 is a perspective view of the cat box in a fully extended condition, showing an alternative embodiment of the cat box door.
Figures 9, 10:
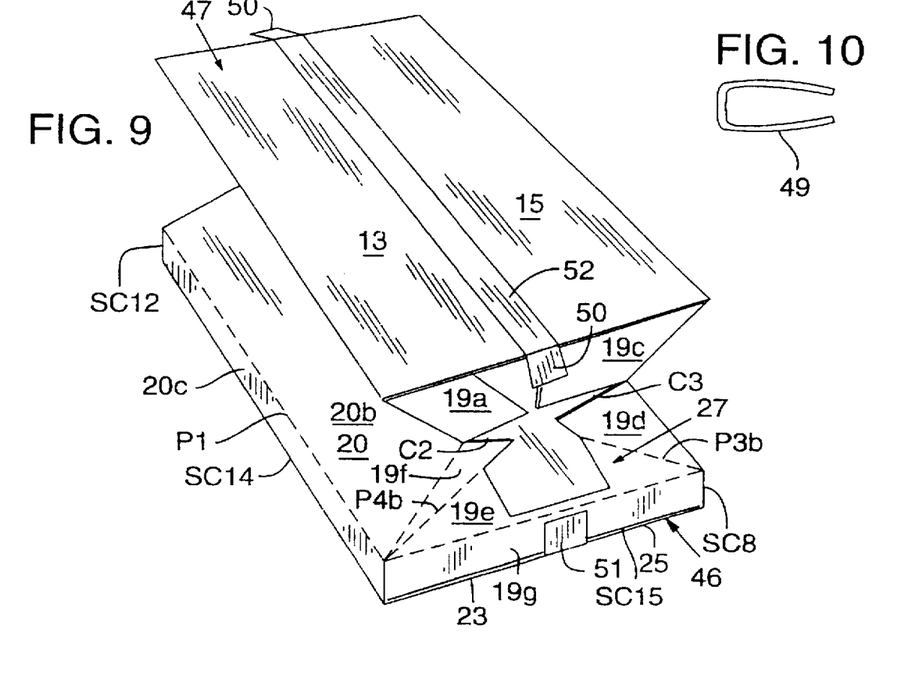
FIG. 9 is a perspective view of the alternative embodiment of FIG. 8 in partially collapsed condition.
FIG. 10 is an end-on view of a brace used to secure the door of FIG. 8 in a fully unfolded condition.

Referring to FIGS. 8–10, the door of an alternative embodiment comprises an opening lacking movable door flaps. Said alternative embodiment can be produced by cutting out an arch-topped rectangular opening sized and positioned to permit easy entry and egress by a full-grown adult cat. In this alternative embodiment, left and right braces 49 can be detachably positioned on the vertical side edges of said opening to hold front subpanels above and below horizontal cut lines C2, C3 in alignment, thereby stabilizing the front panel in unfolded position, as shown in FIG. 8. The braces give rigidity to subpanels 19a–f, causing them to behave like a unitary semi-rigid panel. As shown in FIG. 10, each brace 49 is made of a rigid or semi-rigid material (such as plastic) and preferably has a u-shaped cross section with a relatively narrow longitudinal opening to grip the front subpanels. However, any opening capable of being stabilized in unfolded position and sufficiently large to permit entry and egress by an adult cat is adequate for the door of the above-described alternative embodiment.

In another alternative embodiment, the gripping location may comprise straps or handles attached to the side or roof panels of the cat box. Such straps may be made of any sturdy material and can be attached to the cat box through apertures in said panels or by use of an adhesive means. Said straps or handles may also be useful as a means for unfolding the collapsed cat box.

In another alternative embodiment, the enclosed cat litter container may be a cat litter bag with a removable top. In one such alternative embodiment, the cat litter bag is equipped with a pull tab and a tear strip running around the outer perimeter of the top portion of the litter bag. To prepare the litter package for use, the pull tab is securely grasped and pulled along the tear strip until the top portion of the litter package is fully detached. The top portion of the litter package is then removed and the cat box with enclosed litter package is ready for use.

In another alternative embodiment, the cat litter container may be made of paper, paperboard, cardboard or other disposable material and may be oblong, oval or irregular in shape. Said cat litter container may be secured to the floor or side panels of the cat box by an attachment means or by being closely fitted in snug friction bearing engagement with the side and end panels of the cat box.

It will be appreciated that the overall appearance and construction of the present invention can be modified. For example, the roof can be modified significantly to give the box a less box-like appearance, including one having a pitched roof. Graphics and other printed indicia can be provided on the exterior of the box to make it resemble a chateau, barn, cabin or other housing structure.

Having described and illustrated the principles of my invention with reference to a preferred embodiment and several variations thereon, it should be apparent that the invention can be modified in arrangement and detail without departing from its principles. Accordingly, we claim all modifications as may come within the scope and spirit of the following claims:

We claim:

1. A collapsible animal box comprising:
   a foldable front panel having a door opening sized and positioned to permit an animal to enter and exit the box;
   a foldable rear panel opposing the front panel;
   a pair of opposing foldable side panels hingedly connected to the front and rear panels;

a roof hingedly connected to one or more of the front, rear and side panels; and a floor hingedly connected to one or more of the front, rear and side panels;

the side panels each having at least one fold line and the front and rear panels each having a plurality of diagonally extending fold lines starting at panel margins and extending toward respective central regions of the panels;

wherein the front, rear and side panels are each inwardly foldable to permit the roof and floor to be collapsed toward one another such that the animal box, when collapsed, creates a compact box for storage, shipment or disposal.

2. The animal box according to claim 1 wherein the front panel includes a door having at least one pivotable door flap, and a peripheral front panel portion at least partially surrounding each door flap, each door flap having a first edge portion which is detached from the peripheral front panel portion and a second edge portion which is hingedly connected to the peripheral front panel portion.

3. The animal box according to claim 2 further including a locking element cooperable with each door flap to secure the door flap in an open position.

4. The animal box according to claim 1 wherein the animal box is constructed from a single blank of cut and scored foldable material.

5. The animal box according to claim 1 further including an animal litter container enclosed within the animal box and disposed between the front and rear panels, between the side panels and between the floor and roof.

6. An animal box blank suitable for assembly into a collapsible animal box comprising:

a front panel having at least one fold line and a door, the door including an opening sized and positioned to permit an animal to enter and exit the animal box once assembled and at least one hingedly pivotable door flap;

a rear panel having at least one fold line;

a pair of opposing side panels, each of the side panels being hingedly connected to the front and rear panels and having at least one fold line;

at least one roof panel hingedly connected to one or more of the front, rear and side panels;

at least one floor panel hingedly connected to one or more of the front, rear and side panels;

wherein the fold lines in the front panel, rear panel, and side panels permit the roof and floor of the assembled animal box to be collapsed toward one another; and wherein the door flap and at least one of the side panels have cooperable locking elements to permit the door flap of the assembled animal box to be pivoted to an open position and locked into place, the door when so locked cooperating with the front panel to impede the front panel from collapsing inwardly.

7. The blank according to claim 6 wherein a peripheral front panel portion at least partially surrounds each door flap, each door flap having a first edge portion which is detached from the peripheral front panel portion and a second edge portion which is hingedly connected to the peripheral front panel portion.

8. A collapsible animal box comprising:

a foldable front panel having a door including an opening sized and positioned to permit an animal to enter and exit the box and at least one hingedly pivotable door flap;

a foldable rear panel opposing the front panel;

a pair of opposing foldable side panels hingedly connected to the front and rear panels;

a roof hingedly connected to one or more of the front, rear and side panels; and a floor hingedly connected to one or more of the front, rear and side panels;

the front, rear and side panels each having at least one fold line to permit the roof and floor to be collapsed toward one another; and wherein the door flap and at least one of the side panels have cooperable locking elements to permit the door flap of the assembled animal box to be pivoted to an open position and locked into place, the door when so locked cooperating with the front panel to impede the front panel from collapsing inwardly.

9. The animal box according to claim 8 further comprising a pair of opposed gripping devices cooperable with respective side panels to facilitate gripping of the cat box.

10. The animal box according to claim 8 wherein the front, rear and side panels and roof and floor are made of a cardboard material.

11. The animal box according to claim 9 wherein a peripheral front panel portion at least partially surrounds each door flap, each door flap having a first edge portion which is detached from the peripheral front panel portion and a second edge portion which is hingedly connected to the peripheral front panel portion.

12. The animal box of claim 8 further including an animal litter container sized and shaped to substantially fill a bottom portion of the space enclosed by the animal box.

13. The animal box of claim 12 further including animal litter contained within the animal litter container.

14. A collapsible animal box comprising:

a front panel having a door opening sized and positioned to permit an animal to enter and exit the animal box;

a rear panel opposing the front panel;

a pair of opposing side panels hingedly connected to the front and rear panels, each of the side panels having at least one fold line;

at least one roof panel hingedly connected to one or more of the front, rear and side panels; and at least one floor panel hingedly connected to one or more of the front, rear and side panels;

wherein the front and rear panels each have a plurality of diagonally extending fold lines starting at panel margins and extending toward respective center regions of the panels such that the fold lines of the front, rear and side panels permit the roof and floor of the assembled animal box to be collapsed toward one another.

15. The animal box according to claim 14 wherein the front panel includes a door having at least one pivotable door flap, and a peripheral front panel portion at least partially surrounding each door flap, each door flap having a first edge portion which is detached from the peripheral front panel portion and a second edge portion which is hingedly connected to the peripheral front panel portion.

16. The animal box according to claim 15 further including a locking element cooperable with each door flap to secure the door flap in an open position.

\* \* \* \* \*